July 27, 1948. A. H. EMERY 2,445,875
COMBINED COMPARATOR AND LIMIT GAUGE
Filed Feb. 29, 1944
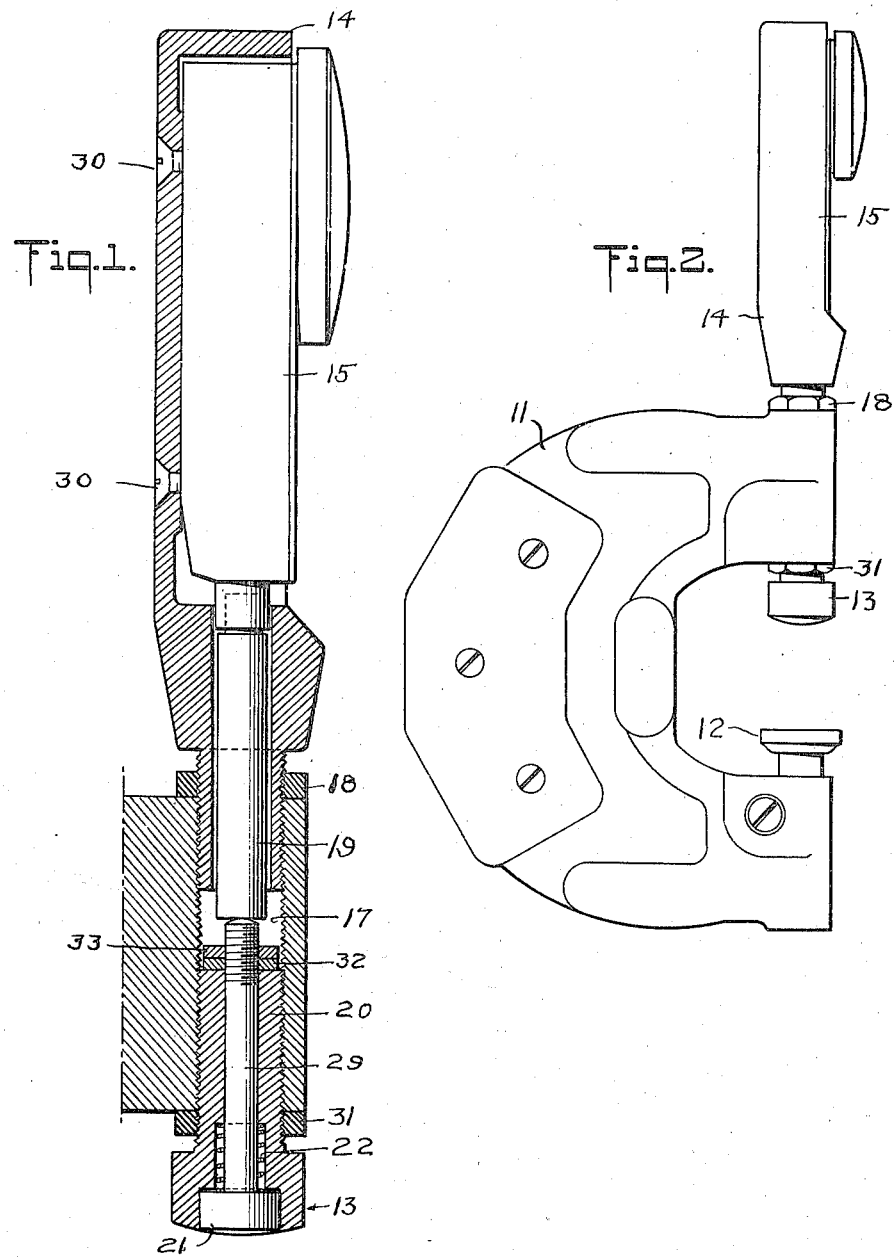
INVENTOR
ALFRED H. EMERY
BY Darby & Darby
ATTORNEYS Patented July 27, 1948

2,445,875

UNITED STATES PATENT OFFICE 2,445,875

COMBINED COMPARATOR AND LIMIT GAUGE

Alfred Hamilton Emery, Wappingers Falls, N. Y., assignor to Standard Gage Company, Inc., Poughkeepsie, N. Y., a corporation of New York Application February 29, 1944, Serial No. 524,357

3 Claims. (Cl. 33—147)

The present invention relates to a combined indicator having features generally attributed to a snap or limit type of gage and likewise features generally attributed to a comparator type of gage.

More particularly still, the invention relates to a gage capable of indicating whether a piece measured is within the "go" and "no go" limits set forth and at the same time capable of showing to exactly what point within those limits the piece has been processed.

In general, the gage of this invention comprises a U-shaped frame of the type generally utilized for snap gages carrying a stationary plane surfaced button in one arm thereof and in the other arm thereof a spherically surfaced button, the central portion of which is movable whereby the dimension set between the stationary anvil and the movable central portion of the measuring button when that portion is at one extreme of its movement, constitutes a "no go" measurement, and the distance between the anvil and the movable portion of the measuring button when at the other extreme of this movement, constitutes the "go" measurement. In this device the movable central portion of the measuring button co-acts with the plunger of a dial gage such as that illustrated in my Patent No. 2,226,756 of December 31, 1940. Thus the exact measurement of any piece within the tolerance limits set may be read by observation of the dial indicator.

It is an object of this invention to provide a combined comparator and snap or limit gage.

It is a further object of this invention to provide such an instrument in which the movement of the plunger of the dial gage is so limited as to make it impossible to operate the gage beyond its working limits and thereby damage the gage.

It is a still further object of this invention to provide a combined instrument in which both the main dimension to be measured and the tolerance may be adjusted and in which such adjustment will not interfere with proper reading of the dial indicator.

Other objects and features of the invention will appear when the following disclosures are considered in connection with the appended drawings in which:

Figure 1 is a fragmentary cross-sectional view of one arm and one measuring button of the combined dial.

Figure 2 is an elevation of the combined gage of my invention.

Referring now to the drawings and particularly Figure 2 thereof, it will be seen that there is provided the usual U-shaped snap gage frame 11 which is an iron casting properly dimensioned for the particular range of measurement intended. In the lower arm of this frame, as seen in Figure 2, there is a plane surfaced measuring button 12 which is adjusted with respect to the frame in the usual manner and is locked in its adjusted position in any suitable manner.

In the upper arm of the frame member 11 there is supplied a gaging button 13. Likewise fastened in this arm is a housing 14 in which a dial indicator gage 15 (of the type shown in my above mentioned patent) is fastened by any suitable means as for example the screws 30. The housing 14 above mentioned is suitably fastened in the frame member 11 this being accomplished by screwing the depending portion of the housing 14 into the threaded bore 17 in the arm of the gage 11 as is clearly shown in Figure 1. When so positioned the housing is locked by means of the lock or jam nut 18 which bears against the upper arm of the frame member 11. Dial gage 15 is provided with an extension 19 for its usual contact plunger which extension is screwed into the plunger. It will be noted that this extension 19 is smaller than the diameter of the depending portion of the housing 14 so that no contact is made between these two pieces.

The upper measuring button assembly 13 comprises a sleeve 20 which is externally threaded and mates with the internally threaded bore 17 of the upper arm of the frame, the sleeve being provided with a lock nut 31 by which it may be held in its adjusted position. The sleeve 20 terminates at its lower end in the enlarged cylindrical portion, the lower face of which is ground and lapped to a spherical surface as is clearly shown in Figures 1 and 2.

The internal bore of member 20 is enlarged at its lower end as is clearly indicated in Figure 1 to form a cavity in which a spring 22 is placed. Member 20 is further enlarged below this cavity to form a chamber in which a central portion 21 of the measuring button is inserted, this button being ground and lapped at its lower surface to form a continuation of the lower surface of the sleeve 20 above described. Button 21 is provided with a shank or stem 29 which extends through the internal bore of the sleeve 20. The shank 29 is threaded at its upper end and is provided with the lock nuts 32 and 33 by means of which the range of tolerance of the instrument may be adjusted, in other words, by means of which the amount of play between the rear face of the button 21 and the shouldered chamber in the sleeve 20 may be adjusted. The spring 22 being placed in the cavity before mentioned and being a compression spring tends to hold the button 21 in its outer or lower position with the lock nut 32 resting against the end of sleeve 20.

The adjustment of nuts 32 and 33 is always such that the distance between the rear face of button 21 and the shoulder of the chamber in which it operates is always less than the maximum range of the dial indicator 15 which assures that there can be no damage caused by "jamming" the indicator 15. It will be clear now that if the lock nuts 32 and 33 are so adjusted on the shank 29 of button 21 as to make the total movement of the button equal to the range of tolerance, and the position of the sleeve 20 in the frame adjusted so that the dial indicator indicates the lower tolerance limit and, furthermore, the stationary anvil 12 adjusted (with Johansson or Hoke blocks equal to the set dimension in position thereon) until the dial indicates zero then any piece which is below the lower tolerance limit will fail to cause a reading of the dial indicator while any piece which is between the tolerance limits will pass between the measuring buttons and will cause a reading of the dial indicator during its passage, while any piece which is above the upper tolerance limit will not pass between the measuring buttons.

In use the instrument may be mounted upon a stand and used solely as a comparator if desired, or it may be used solely as a snap gage if that is desirable. In either event the dial indicator may be caused to face in any desired direction by simply screwing its housing into or out of its upper measuring frame, the adjustment above described being accordingly altered, of course.

The mode of adjusting the instrument may be made clearer by taking a specific example. Let it be assumed that a piece is to be measured, the standardized dimension of which is 1.0000 inch, plus or minus 0.0002 inch. The upper measuring button 13 is removed from the instrument and set by use of any suitable means such as a dial indicator or Johansson blocks so that the movement of the button 21 thereof is 0.0004 inch. Following this the button 13 is replaced in the instrument and adjusted in the bore 17 until the hand of the dial indicator 15 gives a reading of minus 0.0002. Next, a Johansson or Hoke block or a stack of such blocks is placed on the lower anvil 12 and the anvil then adjusted until the reading of the dial indicator hand is zero. The instrument is now ready for use and it will be seen that any piece whose dimension is less than 0.9998 will cause no reading of the dial indicator gage thereby indicating that the piece is outside of the tolerance limits. Moreover, any piece which is greater than 1.0002 inches will fail to pass between the anvil and the measuring button since the rear face of the button 13 will have made contact with the shoulder of the cavity in the sleeve member 20 as has been described. Each piece may in addition, if desirable, be checked as to its exact reading by merely reading the dial indicator while the piece is in position between the anvil 12 and measuring button 21.

While I have described a preferred embodiment of my invention it is to be understood that other forms may be substituted therein and consequently, I do not wish to be limited by the foregoing description but on the contrary, I prefer that the scope of my invention be determined solely by the appended claims.

What is claimed is:

1. In a combined comparator and limit gage, in combination, a U-shaped frame, an anvil mounted in one arm of said frame, a measuring element comprising an outer sleeve and inner button mounted in the second arm of said frame, said button having a shank which extends through said sleeve, said sleeve being longitudinally adjustably mounted in said second arm, resilient means for urging said button to its outer position with respect to said sleeve, adjustable means for limiting the movement of said button with respect to said sleeve to limit the movement to the overall tolerance permitted, a dial indicator likewise adjustably mounted in said second arm of said frame, said motion limiting means serving to prevent operation of the dial indicator beyond its range, and means for transmitting movement from said button to said dial indicator said adjustment of said sleeve in said upper arm serving to set the gage so that the dial indicator reads zero when the measured piece is of a selected dimension between the upper and lower tolerance limits.

2. In a combined comparator and limit gage, in combination, a U-shaped frame, an anvil mounted in one arm of said frame, a measuring element comprising an outer sleeve and inner button mounted in the second arm of said frame, said button having a shank which extends through said sleeve, said sleeve being longitudinally adjustably mounted in said second arm, adjustable means for limiting the movement of said button with respect to said sleeve to thereby set the overall tolerance, a housing rotatably and linearly adjustably mounted in said second arm of said frame, and a dial indicator mounted in said housing with its plunger extending into the said second arm of said frame and making contact with the shank of said measuring button to transmit measuring movement from said measuring button to said dial indicator, said rotatable mounting of said indicator housing serving to render the indicator readable from any desired position said linear adjustment of said housing and said sleeve serving to set the dial indicator to indicate zero when the pre-selected linear measurement between the tolerance limits exists between the measuring button and said anvil.

3. In a combined comparator and limit gage, in combination, a U-shaped frame, an anvil mounted in one arm of said frame, a dial indicator housing adjustably mounted in a bore in the second arm of said frame, a dial indicator mounted in said housing with its plunger extending into the said bore, a measuring element comprising an outer sleeve and an inner measuring button said sleeve being longitudinally adjustably mounted in said bore in said second arm, a shank on said measuring button extending through said sleeve and making contact with said dial indicator plunger, resilient means for extending said measuring button and its shank outwardly with respect to said sleeve, means comprising a shouldered chamber in said sleeve for limiting the inward movement of said measuring button with respect thereto and means comprising lock nuts on said shank for limiting the outward movement of said button with respect to said sleeve, whereby the range of movement of said measuring button may be limited and the tolerance limits set.

ALFRED HAMILTON EMERY.

REFERENCES CITED

The following references are of record in the file of this patent:

UNITED STATES PATENTS

| Number | Name | Date |
|---|---|---|
| 903,484 | Lane et al. | Nov. 10, 1908 |
| 1,491,613 | Miller | Apr. 22, 1924 |
| 1,664,583 | Wheelock | Apr. 3, 1928 |
| 1,892,969 | Schneider | Jan. 3, 1933 |
| 1,921,791 | Syme | Aug. 8, 1933 |

FOREIGN PATENTS

| Number | Country | Date |
|---|---|---|
| 203,718 | Switzerland | Mar. 15, 1939 |

Certificate of Correction

Patent No. 2,445,875.

July 27, 1948.

ALFRED HAMILTON EMERY

It is hereby certified that error appears in the printed specification of the above numbered patent requiring correction as follows: Column 4, line 41, claim 2, after the word and comma "arm," insert *resilient means for urging said button to its outer position with respect to said sleeve,*; and that the said Letters Patent should be read with this correction therein that the same may conform to the record of the case in the Patent Office.

Signed and sealed this 5th day of October, A. D. 1948.

[SEAL]

THOMAS F. MURPHY,
*Assistant Commissioner of Patents.*